United States Patent [19]
Rokicki

[11] Patent Number: 6,070,227
[45] Date of Patent: May 30, 2000

[54] MAIN MEMORY BANK INDEXING SCHEME THAT OPTIMIZES CONSECUTIVE PAGE HITS BY LINKING MAIN MEMORY BANK ADDRESS ORGANIZATION TO CACHE MEMORY ADDRESS ORGANIZATION

[75] Inventor: Tomas G. Rokicki, Palo Alto, Calif.

[73] Assignee: Hewlett-Packard Company, Palo Alto, Calif.

[21] Appl. No.: 08/963,673

[22] Filed: Oct. 31, 1997

[51] Int. Cl.[7] .................................................. G06F 12/00
[52] U.S. Cl. ........................... 711/117; 711/111; 711/126
[58] Field of Search ............................... 711/5, 111, 126, 711/129, 154, 202, 217

[56] References Cited

U.S. PATENT DOCUMENTS

| | | | |
|---|---|---|---|
| 5,269,010 | 12/1993 | MacDonald | 395/425 |
| 5,274,786 | 12/1993 | Diehl | 395/425 |
| 5,303,364 | 4/1994 | Mayer et al. | 711/140 |
| 5,390,308 | 2/1995 | Ware et al. | 711/5 |
| 5,745,913 | 4/1998 | Pattin et al. | 711/105 |

*Primary Examiner*—Do Hyun Yoo
*Assistant Examiner*—Mehdi Namazi
*Attorney, Agent, or Firm*—David A. Plettner

[57] ABSTRACT

A main memory indexing scheme optimizes consecutive page hits in computer systems having a main memory system and a cache memory. In accordance with the present invention, one or more bank select bits required by the main memory system are formed from one or more of the address bits that are used by the cache memory as the tag field. Preferably, the lower-order bits of the tag field are used. To increase the page hit rate even further, additional bank select bits are formed from the address bits immediately above the bits used to access columns. In one embodiment of the present invention, address bits are simply mapped to bank bits using a one-to-one correspondence. In another embodiment, address bits from the tag field and address bits immediately above the column bits are combined using a function such as an exclusive-OR operation or an addition operation, with the result of the function provided to the bank select bits. The present invention greatly improves the page hit rate of computer systems, while requiring few additional resources.

18 Claims, 7 Drawing Sheets

| | |
|---|---|
| 32 | 1 |

LOGICAL ADDRESS

| UNUSED | BANK | ROW | COLUMN | CACHE LINE |
|---|---|---|---|---|
| 32  29 28 | 25 24 | 14 13 | 7 6 | 1 |

MAIN MEMORY
ORGANIZATION

| TAG | INDEX | CACHE LINE |
|---|---|---|
| 32 | 21 20 | 7 6  1 |

CACHE MEMORY
ORGANIZATION

| UNUSED | ROW | BANK | ROW | BANK | COLUMN | CACHE LINE |
|---|---|---|---|---|---|---|
| 32  29 28 | 23 22 21 20 | | 16 15 14 13 | | 7 6 | 1 |

LOGICAL ADDRESS TO
MAIN MEMORY ADDRESS
MAP

MAIN MEMORY BANK INDEXING SCHEME THAT OPTIMIZES CONSECUTIVE PAGE HITS BY LINKING MAIN MEMORY BANK ADDRESS ORGANIZATION TO CACHE MEMORY ADDRESS ORGANIZATION

CROSS REFERENCE TO RELATED APPLICATION

The present application contains subject matter related to a co-pending U.S. patent application entitled "A Fast And Compact Address Bit Routing Scheme That Supports Various Dram Bank Sizes And Multiple Interleaving Schemes" by Anurag P. Gupta et. al. This application was filed on Oct. 31, 1997, is assigned to the same assignee as the present application, assigned U.S. application Ser. No. 08/962,490, and is hereby incorporated by reference.

1. Field of the Invention

The present invention relates to computer memory systems. More specifically, the present invention relates to configuring memory systems to optimize consecutive page hits.

2. Description of the Related Art

In the art of computing, it is common to store program instructions and data in dynamic random access memory (DRAM). The most common type of DRAM memory cell is a single transistor coupled to a small capacitor. A data bit is represented in the memory cell by the presence or absence of charge on the capacitor. The cells are organized into an array of rows and columns.

FIG. 1 is a block diagram of a typical prior art memory chip 10 that is based on a 4 megabit memory array 12 having 2,048 rows and 2,048 columns. Memory chip 10 has a 4 bit wide data input/output path. Row demultiplexor 15 receives an 11 bit row address and generates row select signals that are provided to memory array 12. Page buffer 14 acts as a temporary storage buffer for rows of data from array 12. Column multiplexor 16 receives a 9 bit column address and multiplexes the 4 bit data input/output path to a selected portion of buffer 14.

The distinction between rows and columns is significant because of the way a memory access proceeds. Page buffer 14 is formed from a single row of cells. The cells act as a temporary staging area for both reads and writes. A typical DRAM access consists of a row access cycle, one or more column accesses cycles, and a precharge cycle. The precharge cycle will be described in greater detail below.

The row access cycle (also called a page opening) is performed by presenting the row address bits to row demultiplexor 15 to select a row. The entire contents of that row are then transferred into page buffer 14. This transfer is done in parallel, and it empties all memory cells in that row of their contents. The transfer is done by driving whatever charge exists in each row capacitor down to a set of amplifiers that load page buffer 14. This operation also erases the contents of the capacitors of the row that is accessed. For typical prior art DRAMs, this operation takes approximately 30 ns.

Next, the column access cycle is performed by presenting the column address bits to select a particular column or set of columns, and the data is either read from or written to page buffer 14. During the column access cycle, page buffer 14 acts as a small RAM. The typical access delay for this operation is approximately 30 ns to receive the first 4 bits of data, and 10 ns to receive subsequent 4 bit chunks of data. Several consecutive accesses can be made to the page to access different columns, thereby allowing the entire row to be written to or read from very quickly. For a typical four bit wide DRAM such as that shown in FIG. 1, a page of 2,048 bits (or 256 bytes) can be read out in 512 accesses, or 5.14 μs. Accordingly, the bandwidth of DRAM chip 10 is 49.8 megabytes per second. It is easy to see how a few DRAM chips in parallel can yield very high bandwidth.

The final cycle of the memory access is the precharge cycle, which is also known in the art as page closing. As discussed above, the row access cycle destroyed the contents of the capacitors of the row that was read into buffer 14. Before another row can be read into buffer 14, the contents in page buffer 14 must be transferred back to memory array 12. This process is called the precharge cycle. In most prior art DRAM chips, no address is required because the address of the open row is latched when the contents of that row are transferred into buffer 14, and that address is retained as long as the page is open. Typically, the precharge cycle lasts about 40 ns.

In addition to the normal read and write access cycles, most DRAMs also require refresh cycles. The small capacitors that make up each memory cell suffer from leakage, and after a short period of time, the charge will drain away. To prevent the loss of data, each row must be precharged (opened and closed) at a certain minimum rate. The size of the capacitors and leakage allowed is balanced with the size of the array in such a way that the number of refresh cycles required is a small fraction of the total bandwidth of the DRAM. Typically, DRAMs are engineered such that refreshing the rows at a rate of one row per 60 microseconds is sufficient to maintain the data. Accordingly, while data can be written to and read from page buffer 14 many consecutive times, buffer 14 cannot be held open indefinitely because it must be periodically closed to allow other rows to be refreshed.

There are two primary types of DRAMs known in the art, asynchronous DRAMs and synchronous DRAMs. Asynchronous DRAMs do not have a clock input. Rather, complex timing constraints among various signals and addresses must be satisfied in order for the DRAM to operate properly. The two main control pins for asynchronous DRAMs are "row address strobe" (RAS) and "column address strobe" (CAS). To open a row, RAS is asserted (typically, lowered). To close a row, RAS is deasserted. To access a column CAS is asserted, and to access another column, CAS must be deasserted and then reasserted. Note that CAS can be asserted and deasserted multiple times while RAS is asserted.

In contrast to asynchronous DRAMs, synchronous DRAMs (SDRAMs) accept a clock input, and almost all timing delays are specified with respect to this clock. In addition, SDRAMs usually have two or four different logical arrays of memory (or banks) that can operate independently. Rather than use separate RAS and CAS signals for each bank, a sequence of commands is sent to the DRAM synchronously to perform page opening, column access, and page closing functions. Additional address bits are used for bank selection. One major benefit provided by SDRAMs is pipelining. While one bank is being accessed, another bank can be refreshed or precharged in the background.

Despite these differences, SDRAM organization is very similar to asynchronous DRAM organization. In fact, many memory controllers for asynchronous DRAMs support multiple banks and background refreshing and precharging operations.

DRAM chips can be organized to form main memory systems in a variety of ways. Typically the width and speed of the system bus are synchronized to the width and speed of the main memory system bus by providing the main memory system bus with the same bandwidth as the system bus. Usually system busses are both faster and wider than the data I/O interface provided by individual DRAM chips, so multiple DRAM chips are arranged in parallel to match the bandwidth of the system bus. If a particular computer system has a 16 byte wide data bus that operates at 66 MHZ, then a main memory subsystem of the computer system that operates at 33 MHZ and is constructed with 4-bit wide DRAM chips will typically have 64 DRAM chips arranged in each bank, thereby providing each bank with a bandwidth of nearly a gigabyte per second, which matches the bandwidth of the system data bus. If the bandwidths are not matched, other techniques may be employed, such as using a small FIFO to buffer memory accesses and blocking memory accesses when the FIFO is full.

It is also common for computers to use cache memories to increase performance. A cache memory holds a subset of the contents of main memory and is faster and smaller than main memory. An architecture common in the art provides a level one (L1) cache on the same integrated circuit as the microprocessor, and a level 2 (L2) cache on the system board of the computer. L1 cache sizes are generally in the range of 8 kilobytes to 128 kilobytes, and L2 cache sizes are generally in the rage of 256K bytes to 4M bytes. The smallest unit of memory that can be loaded into a cache memory is known in the art as a cache line.

In a computer system having 16 byte wide system and memory data busses, assume that the cache line size is 64 bytes. Therefore, it will generally take four bus clock ticks for each load to, or store from, a cache line. If the computer's data bus is clocked faster than the DRAMs, it is common to use a small pipelining FIFO to match the speeds, as discussed above. Another alternative is to use a wider memory bus and multiplex it at high speeds onto the computer's data bus, which is also discussed above For simplicity, assume that the computer system described above uses a small pipelining FIFO. If each bank is arranged as 32 4-bit wide DRAM chips to match the width of the system data bus, the minimum memory increment (a single bank) is 32 4-megabit chips, which is 16 megabytes. Typically, when addressing more memory, in order to keep physical memory contiguous, the high order physical address bits are used to select different banks.

Consider a logical address comprised of 32 bits, with each address value capable of being represented by the logical address indexing a byte. In the computer system described above, the memory bus is 16 bytes wide, Therefore, the least significant 4 address bits are ignored because these bits are implicitly represented by the arrangement of DRAM chips within a bank. Since the cache lines are 64 bytes long, the next 2 address bits act as column index bits that are cycled to obtain an entire cache line. The next 7 bits are assigned to the remaining column address bits, and the next 11 bits are assigned to the row address bits. Note that FIG. 1 shows nine column address bits because the two address bits that are used to access a cache line are manipulated by a memory controller, which is not shown in FIG. 1.

This is a total of 24 bits, which correctly matches the 16 megabyte memory bank size discussed above. The address bits between the $25^{th}$ and $32^{nd}$ bit, inclusive, are used to select a particular memory bank, or are unused. The first bank of 32 chips will be selected if addresses are within the first 16 megabytes of the physical address range, the second bank of 32 chips will be selected if addresses are within the next 16 megabytes, and so on. This is the simplest and most common way to select different groups of memory chips, and is widely used in the art.

Consider page buffers of the DRAM chips that form a single bank. All the individual page buffers are accessed in parallel, thereby combining to form a larger "logical" page buffer. As shown in FIG. 1, each DRAM chip 10 has a 2,048 bit, or 256 byte, page buffer 14. Since 32 chips are arranged in parallel, the logical page buffer is 8,192 bytes wide. If the low order address bits are used to index columns, two memory locations having addresses that differ only in the lower 13 bits of the logical memory address will be in the same row, and therefore will be available in a logical page buffer concurrently.

Each bank of 32 parallel DRAM chips has its own set of page buffers. Therefore, a logical page buffer exists for each memory bank provided in the computer system. If the high order address bits are used to select banks, as described previously, then there is an 8 kilobyte logical page buffer for the first 16 megabytes of physical memory, another 8 kilobyte logical page buffer for the next 16 megabytes of physical memory, and so on.

If the system described above employed SDRAMs having bank select bits, the internal banks of the SDRAMs may be viewed as collections of relatively independent banks of DRAMs, with the high order address bits used as bank select bits. Accordingly, for the purpose of illustrating the present invention below, there is little difference between memory banks that are derived from collections of chips addressed independently, and memory banks that are derived from bank select inputs to specific SDRAM chips.

Consider a typical cache line read in the system described above. First, the appropriate bank is selected, and then a row is transferred into the logical page buffers. This takes approximately 30 ns. Next, 4 16-byte chunks are read from the logical page buffer; this takes approximately 60 ns (30 ns for the first 16 byte chunk, and 10 ns for each of the next three 16 byte chunks), and provides a complete cache line. Finally, the logical page buffer is closed; this takes 40 ns. The total time was 130 ns. The time before the first word was read was 60 ns (page open plus first column access). Many system are configured such that the first word available is the first word required by the CPU. The time required to retrieve the first word is known in the art as the "critical word latency".

It is common in the art for a memory controller to gamble that successive references to the same memory bank will access the same row (or page). Such a memory controller is known as a page mode memory controller. A page hit occurs when the memory controller processes a memory access request, and finds that the row that needs to be accessed is already in the logical page buffer. In a page mode memory controller, the page is not closed after an access. Instead, the page is only closed when an access to that bank requires a different page or a refresh cycle occurs.

If a subsequent memory access is indeed for the same page, then the critical word latency is shortened from 60 ns to just 10 ns, a significant savings. If a subsequent memory access is not for the same page, then a penalty is incurred. The old page stored in the logical page buffer must undergo a precharge cycle before a new page can be opened, so the critical word latency is 40 ns (precharge) plus 30 ns (row access) plus 30 ns (first word available), or 100 ns, quite a bit more than the previous value of 60 ns that is achieved when the logical page buffer is precharged after every access.

If p is the probability that the next access is on the same page, then the average critical word latency is 30 ns*p+100 ns*(1−p), (or 100 ns−70 ns*p). Note that the critical word latency decreases as p increases. The point at which the gamble pays off is when the average critical word latency is 60 ns, which, as described above, is the critical word latency achieved when the logical page buffer is closed after each memory access. Accordingly, the point at which it pays to keep the logical page buffer open after each access occurs when there is a greater than 0.571 probability that a sequential memory access will reference the same page.

Assume that in a computer system having a page mode memory controller requests are fed to the memory controller as fast as they can be consumed. Each time a page in a bank is accessed for the first time requires a precharge cycle to close the old page and a row access page to open the new page, which together require 70 ns. As described above, each cache line access from an open page requires 60 ns. Thus, an average cache line access requires 60 ns+70 ns (1−p). In contrast, as discussed above, a non-page mode memory controller requires 90 ns.

In the prior art, many page mode memory controllers simply mapped column bits to the least significant bits of the address, mapped row bits to the address bits immediately after the column bits, and then mapped bank select bits to the highest bits of the address. Given this configuration, assume that a large contiguous memory block that spans page boundaries must be accessed. As long as memory is being accessed from a single page buffer, as described above, no precharge cycles are required. However, when the end of the page is reached and the next page is required, a precharge cycle is required to store the old page and a row access cycle is required to access the new page. Since the row bits are arranged as described above, the next row required will be in the same bank as the previous row (unless the memory block spans a bank boundary).

U.S. Pat. No. 5,051,889 to Fung et al. and entitled "Page Interleaved Memory Access" provides an improvement when accessing contiguous memory that spans page boundaries. Basically, Fung et al. swap the first bank select bit with the first row select bit, thereby causing even memory pages to be stored in a first bank, and odd memory pages to be stored in a second bank. Accordingly, when a series of sequential memory accesses to a contiguous segment of memory cross a page boundary, the memory accesses also cross a bank boundary, which allows the precharge cycle of the first bank to be overlapped with the row access cycle of the second bank.

A similar technique was proposed by Mike Bell and Tom Holman in a paper entitled "Pentium® Pro Workstation/Server PCI Chipset", which was published in the Digest of Papers of the 41$^{st}$ IEEE Computer Society International Conference held Feb. 25–28, 1996. The technique proposed by Bell and Holman is called address bit permuting, and like the memory scheme disclosed by Fung et al., involves swapping a bank bits and row bits.

SUMMARY OF THE INVENTION

The present invention provides a main memory indexing scheme that optimizes consecutive page hits in computer systems having a main memory system and a cache memory. The cache memory is organized by dividing the logical address of the computer system into an index field and a tag field. The index identifies a cache set that comprises a plurality of cache line entries. Associated with each cache line entry is a tag entry. When a cache line is read from main memory, the index defines the set where the cache line will be stored, and the tag and cache line are stored together in an available cache line entry of the set. If a set is full and a read from main memory requires storage in that set, then one of the cache line entries of the set is cast out by writing that cache line entry back to main memory.

The main memory system is organized into a series of banks, and in the case of SDRAMs, ranks. Each bank is organized into columns and rows. Associated with each bank is a page buffer capable of storing a row. Consecutive memory accesses that access the same bank and row are processed much more quickly because the row can be held open in the page buffer.

In accordance with the present invention, one or more bank select bits required by the main memory system are formed from one or more of the address bits that are used by the cache memory as the tag field. Preferably, the lower-order bits of the tag field are used. To increase the page hit rate even further, additional bank select bits are formed from the address bits immediately above the bits used to access columns.

In one embodiment of the present invention, address bits are simply mapped to bank bits using a one-to-one correspondence. In another embodiment, address bits from the tag field and address bits immediately above the column bits are combined using a function such as an exclusive-OR operation or an addition operation, with the result of the function provided to the bank select bits.

The present invention combines and balances two competing phenomena to produce a high page hit rate. The first phenomena is created by "contiguous page" interleaving and allows contiguous memory pages to be simultaneously open in separate page buffers of memory separate banks. The second phenomena is created by "cache effect" interleaving and allows a cache line cast out from the cache memory to access a different bank or rank (and therefore a different logical page buffer) than a corresponding cache line read. The present invention greatly improves the page hit rate of computer systems, while requiring few additional resources.

BRIEF DESCRIPTION OF THE DRAWINGS

FIG. 2A shows the logical address range that is used by the computer system of FIG. 2 to access memory.

FIG. 4 shows address map that represents the bits that are used to access the memory banks of main memory unit shown in FIG. 3.

FIG. 6 shows address map that represents the bits that are used to access the cache memory unit shown in FIG. 5.

FIG. 7 shows a logical address to main memory address map in accordance with an embodiment of the present invention.

DETAILED DESCRIPTION OF THE PREFERRED EMBODIMENTS

The present invention provides a scheme for accessing main memory wherein the bits that are used to select memory ranks and banks are generated using the address bits that form the least significant tag bits of the cache memory that is coupled to the main memory. By using the least significant tag bits as bank bits, there is a high probability that a cache line cast out, which displaces a cache line from the cache memory and writes the cache line to main memory, and an associated cache line read, which reads a cache line from main memory into the cache memory location that was that was just freed by the cast out, will access separate page buffers, thereby increasing the ratio of page hits. Put another way, a series of cast outs will consecutively access one page buffer, thereby producing a high ratio of page hits, while the cache line reads associated with the cast outs will come from another page buffer, which also produces a high ratio of page hits. In the prior art, a cast out and the associated cast line read often go to the same memory bank, but typically reference different rows. Accordingly, a precharge cycle is required between a cast out and the associated cache line read.

Figure 2:
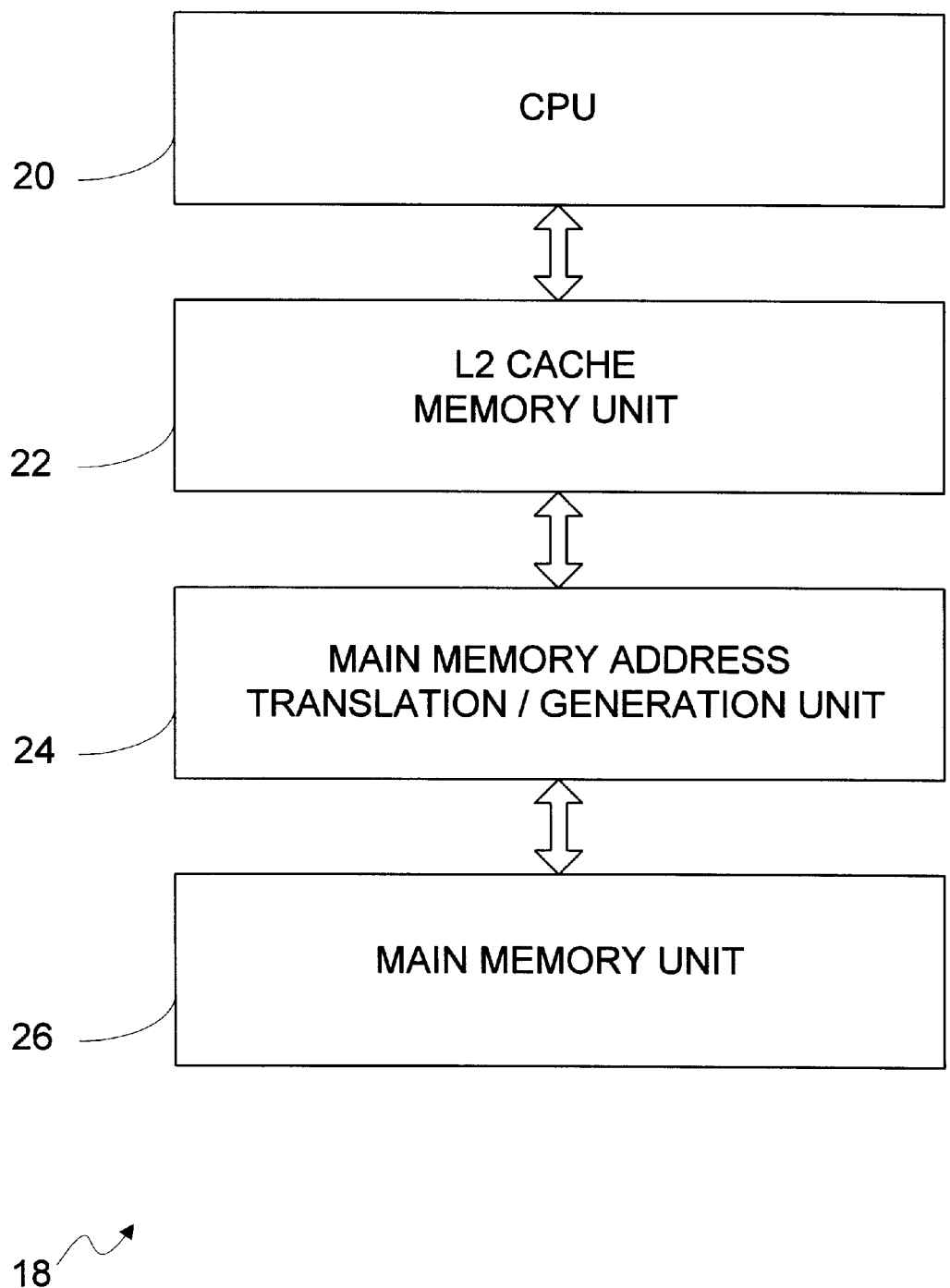
FIG. 2 is a block diagram of a computer system that includes the present invention.

The present invention will be described with reference to the block diagram of computer system 18 in FIG. 2. Computer system 18 includes a central processing unit (CPU) 20, a level 2 (L2) cache memory unit 22, a main memory address translation/generation unit 24, and a main memory unit 26.

CPU 20 is a typical CPU known in the art. FIG. 2A shows the logical address 21 that is used by CPU 20 to access memory. Logical address 21 is 32 bits wide.

Most of the features of the present invention are implemented by main memory address translation/generation unit 24. An embodiment of unit 24 is disclosed in a co-pending U.S. patent application entitled "A Fast And Compact Address Bit Routing Scheme That Supports Various Dram Bank Sizes And Multiple Interleaving Schemes" by Anurag P. Gupta et. al. which is incorporated by reference above.

Figure 1:
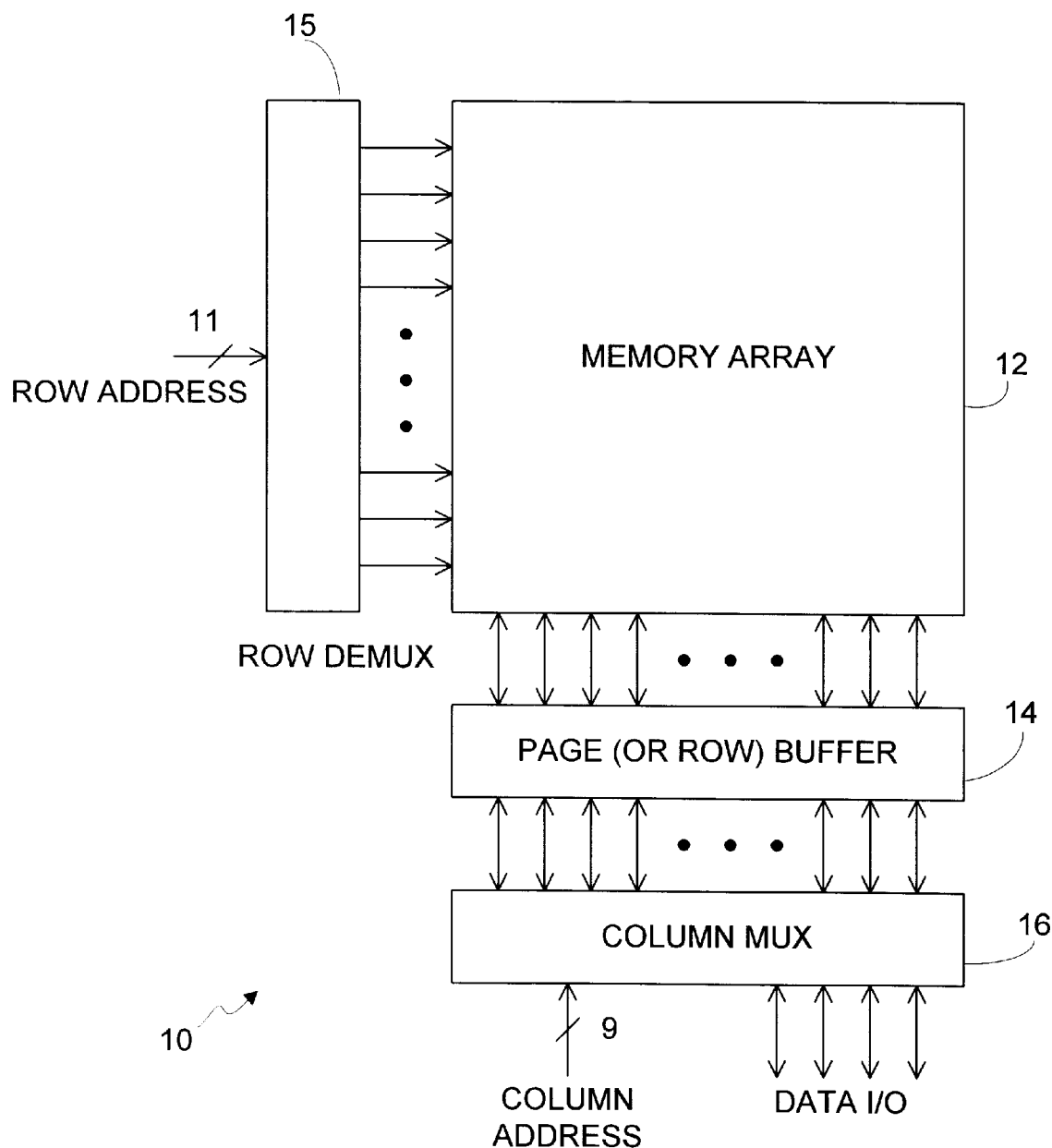
FIG. 1 is a block diagram of a typical prior art memory chip that is based on a 4 megabit memory array having 2,048 rows and 2,048 columns.
Figure 3:
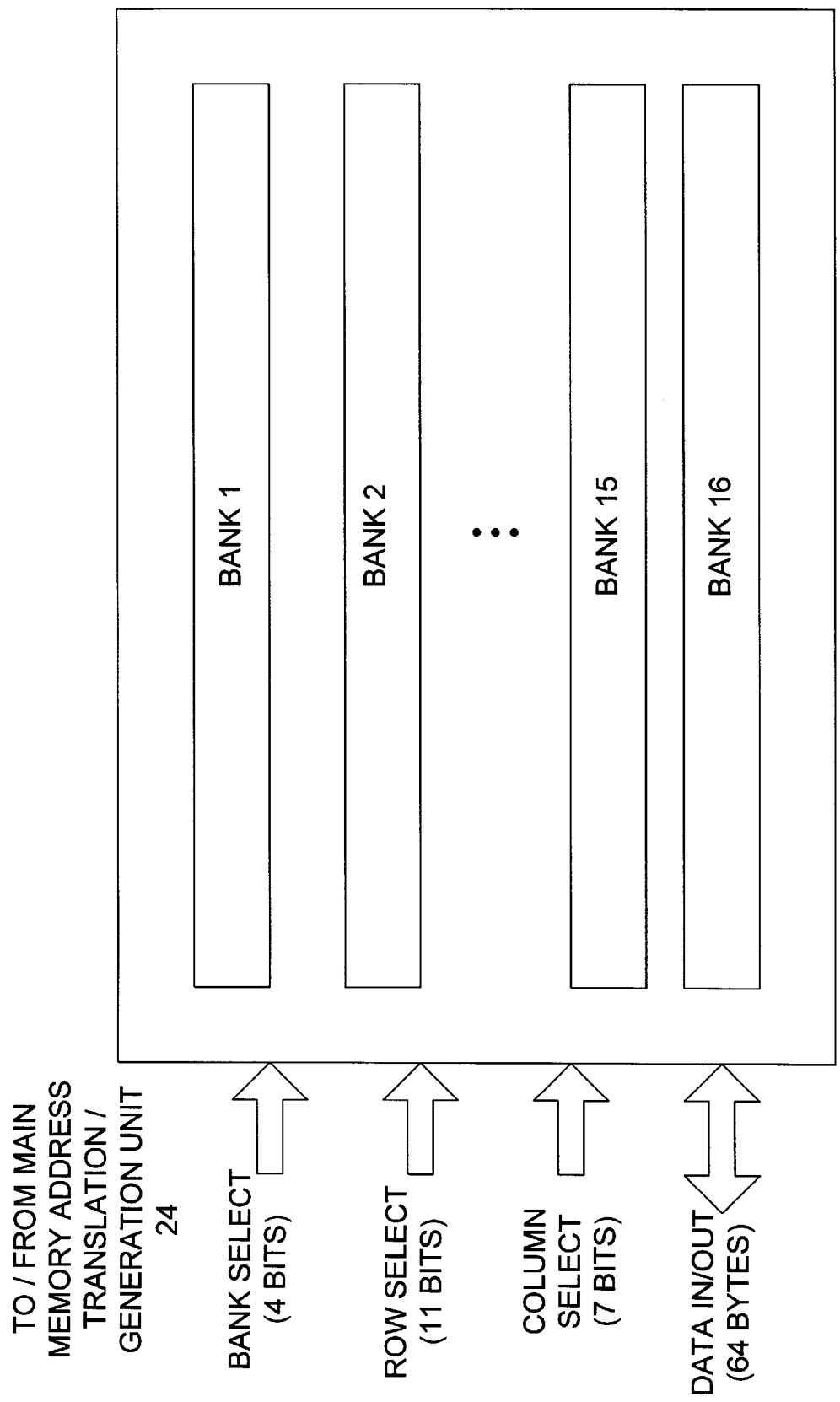
FIG. 3 shows a main memory unit of the computer system shown in FIG. 2.

Main memory unit 26 is shown in greater detail in FIG. 3. Unit 26 is constructed from DRAM memory chips, such as DRAM chip 10 in FIG. 1. The banks of unit 26 are arranged substantially as discussed in the Description of the Related Art section above, with each bank comprised of 32 4-megabit DRAM chips arranged in parallel. Each DRAM chip is 4 bits wide. The convention used herein will be to use "1" as the first number when numbering a series of objects. Accordingly, the 16 memory banks of unit 26 are labeled Bank 1 through Bank 16.

Main memory unit 26 has 16 banks, and therefore provides a total of 256 megabytes of storage. Accordingly, main memory address translation/generation unit 24 provides 4 bank select bits to unit 26 to select from among the 16 available banks. In addition, unit 24 provides 11 row select bits and 7 column select bits. Each memory access request from unit 24 reads or writes a complete 64 byte cache line, so main memory unit 24 cycles two of the column bits internally to generate four column accesses. Also, for the sake of simplifying the discussion of the present invention, assume that the logical page buffer of each bank is held open until a bank receives a memory access request to a memory location that is not in the page buffer, and assume that the DRAM chips do not require refresh cycles. Since refresh cycles are a tiny fraction of memory accesses, this assumption does not introduce significant error.

FIG. 4 shows address map 28, which represents the bits that are used to access the memory banks of main memory unit 26. As discussed above, bits 1–6 represent the 64 bytes within a cache line. The next 7 bits (bits 7–13) are the column bits. Bits 14–25 are the 11 row bits. Finally, bits 25–28 are the 4 bank select bits. Bits 29–32 are unused. Accordingly, 28 bits of the 32 bit address are used to access main memory unit 26.

Figure 5:
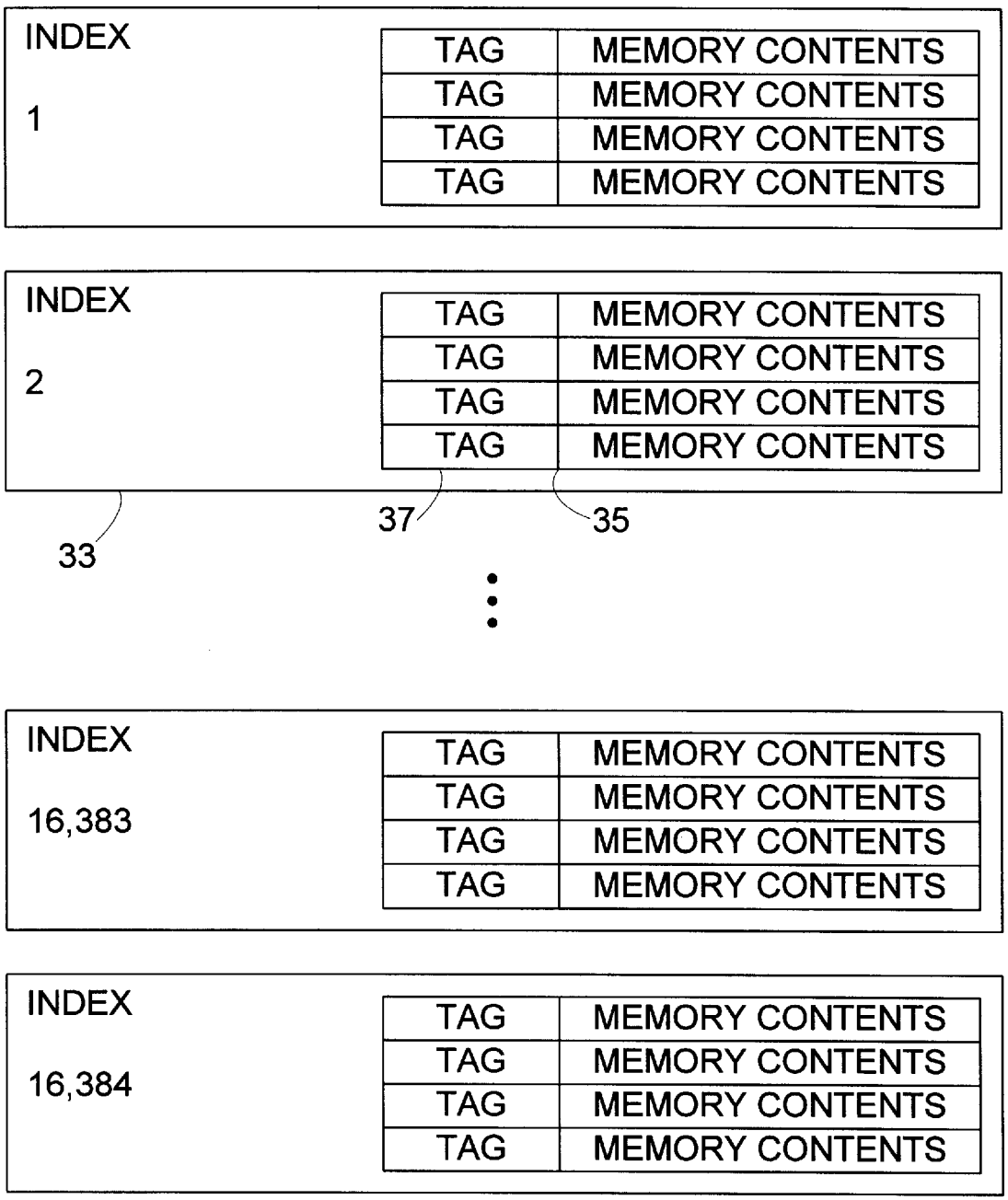
FIG. 5 shows the memory organization of a cache memory unit of the computer system shown in FIG. 2.

L2 cache memory unit 22 is a 4 megabyte, 64 byte line, 4-way associative cache. FIG. 5 shows the memory organization of L2 cache memory unit 22, and FIG. 6 shows address map 30, which represents the bits that are used to access unit 22.

Set associative caches such as cache memory unit 22 are well known in the art. As illustrated by address map 30 of FIG. 6, the first 6 bits (bit 1–6), represent the 64 bytes within a cache line. The next 14 bits (bits 7–20) represent the cache index, and the final 12 bits (bits 21–32) represent the cache tag.

With reference to FIG. 5, the 14 index bits provide 16,384 individual indexes (such as index 2, which is labeled by reference number 33 in FIG. 5), with each index referencing a set of four cache line entries (such as cache line entry 35). Associated with each cache line entry is a tag field (such as tag field 37). The index in combination with the tag define the corresponding memory address in main memory unit 26. Since there are 16,384 sets, each set contains four cache line entries, and each entry is 64 bytes, the size of unit 22 is four megabytes, as discussed above.

Consider a memory read request from CPU 20. The index portion of the address is used to identify a set, and the tag portion of the address is compared with all the tag entries of the set to see if the memory read request can be satisfied by L2 cache memory unit 22. If the memory contents required by the read request are in the cache, the contents are provided to CPU 20. This is known in the art as a "cache hit". If the contents are not in the cache, then the contents must be loaded into the cache from main memory unit 26. This is known in the art as a "cache miss".

Assume that a cache miss occurs, and the index references a set in which all the cache line entries are filled. One of the entries must be cleared so that the cache miss can be serviced. Typically, an entry will be selected based on an algorithm, such as the least recently used (LRU) algorithm. It is also common to associate a "dirty bit" with every cache line entry in the cache. The dirty bit indicates whether the contents of the cache line entry have changed. In other word, the dirty bit indicates whether the contents of the cache line entry still reflect the contents of the corresponding location in main memory. If the dirty bit is clear, then the contents can be overwritten. However, if the dirty bit is set, the contents must be written back to main memory before the entry can be made available to store the memory contents retrieved because of the cache miss. Writing the contents of a cache line entry back to main memory to make room for a cache miss to be serviced in known in the art as a "cache line cast out".

To understand the present invention, assume that L2 cache memory unit 22 is full, and every entry is dirty. Further assume that CPU 20 seeks to read a block of contiguous memory via a series of memory read requests. Every read request to a new 64 byte chunk will produce a cache miss, and therefore, a cache line cast out. As the memory read requests proceed, the lower order bits of the address contained in the request will vary, thereby selecting different indexes. However, the upper order bits (which also form the tag) will tend to remain constant. Further assume that the cache lines which are selected for replacement had been loaded by a similar load of a block of contiguous memory. Again, the indexes of the cache line cast outs will vary but the tags will tend to be constant.

Since memory being read into the cache and the memory being displaced from the cache will often be from the same program, and programs tend to be contiguous in memory, the upper order tag bits of the cache lines being cast out will tend to be the same as the upper order tag bits of the of the cache lines being read in, while the lower order tag bits will be more likely to vary.

Consider what happens in a prior art computer system having a cache memory organized in accordance with FIG. 6 and a main memory organization wherein contiguous groups of logical address bits are sequentially mapped to the main memory bits shown in FIG. 4. Such an organization is known in the art as a BRC indexing scheme. Assume that a CPU reads a block of memory under the conditions described above, and the block of memory that is cast out form the cache resides in the same 16 megabyte bank as the block of memory that is read into the cache. A cache line cast out and the corresponding cache line read into the entry cleared by the cast out will, of course, have the same index. However, the cast out and the corresponding read will have different tags that vary by the by the lower order tag bits. Accordingly, each cast out will access a different page than the corresponding read. Assuming that the memory requests are processed sequentially, every cache miss will require two precharge cycles, one to service the cast out and one to service the corresponding cache read. Therefore, in prior art systems, the use of a cache tends to wreck havoc with the ability of a main memory system to achieve a high page hit rate. Note that if the cast out and the corresponding read access different banks, than two logical page buffers may be held open simultaneously. However, it is much more likely that the same bank will be accessed.

FIG. 7 shows logical address to main memory address map 32, which is an embodiment of the present invention. The mapping function shown in FIG. 7 is performed by main memory address translation/generation unit 24. In address map 32, bits 1–6 represent the 64 byte cache line. Bits 7 and 13 of the logical address are mapped to the column bits of main memory unit 26. Experience has shown that it is desirable to map the lowest order bits of the logical address to the column bits because many "hot spots" in programs tend to fit within a single page. Accordingly, such hot spots can be accessed from a single open page without intervening precharge cycles, thereby increasing the page hit rate.

Bits 14 and 15 of the logical address are supplied to two of the bank select bits. This allows adjacent pages to be open simultaneously in separate banks, and allows row access cycles to be overlapped with precharge cycles. The term "contiguous page interleaving" will be used herein to describe mapping contiguous pages to separate banks. Bits 16–20 of the logical address are mapped to five of the row bits.

Bits 21 and 22 of the logical address are mapped to two of bank select bits. Note that bits 21 and 22 correspond to the lower two bits of the cache tag. Finally, bits 23–28 of the logical address are mapped to 6 of the row bits. Bits 29–32 of the logical address are not used.

In accordance with the embodiment of the present invention shown in FIG. 7, assume that CPU 20 reads a block of memory under the conditions described above, with the block of memory that is cast out from the cache residing in the same 16 megabyte bank as the block of memory that is read into the cache. A cache line cast out and the corresponding cache line read into the entry cleared by the cast out will have the same index. However, if the cast out and the corresponding read are within 4 megabytes of each other, the 2 least significant bits of the tag will differ. Furthermore, if the cast out and corresponding read are farther than 4 megabytes apart, but within 16 megabytes of each other, there will by a 75% chance that the two least significant bits of the tag will differ.

If the two least significant bits of the tag differ, then the cast outs will access a first bank and the corresponding cache line reads will access a second bank. Thus, as the block is read into memory, the cast outs may be written into the logical page buffer of the first bank and the cache line reads may be read from the logical page buffer of the second bank without requiring intervening precharge cycles. Accordingly, the present invention provides a dramatic improvement in the page hit rate achieved when a cache miss occurs and dirty cache lines must be cast out. The term "cache effect interleaving" will be used herein to describe mapping memory accesses that differ in the lower order tag bits to separate banks.

The embodiment discussed above has 16 banks, which provides four bank select bits. However, many systems have fewer banks, and some have more. Since there are a limited number of bank select bits, what is the optimal way to allocate the bank bits between contiguous page interleaving and cache effect interleaving to maximize the page hit rate? It has been found that the optimal allocation is dependent on the type of application that is being executed. Of course, the optimal allocation will also vary based on cache size (including the boundary between index bits and tag bits and the size of the cache line) and the size and organization of memory bytes. However, for any given configuration, one skilled in the art can use the teachings described herein to simulate test code and trace memory addresses using a variety of different mappings, thereby finding the overall optimal allocation for that configuration.

For example, a series of simulations representative of different types of program code were performed on the computer system described above. The best overall allocations are shown in table 49 of FIG. 8 for systems having between 1 and 8 bank bits. The top row of table 49 shows the configuration of the main memory system, the bottom row of table 49 shows the configuration of the cache memory, and the middle rows of table 49 show the optimal logical address to main memory mapping based on the number of bank bits. Note that a system having a single bank bit will have 2 banks and 32 megabytes of memory, while a system having 8 bank bits will have 256 banks and 4 gigabytes of memory.

For small bank sizes, the benefits provided by cache effect interleaving dominate. As a matter of fact, it is not advantageous to devote a single bank select bit to contiguous page interleaving until three bank select bits are available. Another interesting thing to note is that once the number of bank select bits allocated to cache effect interleaving reaches three, it is better to allocate all addition bank select bits to contiguous page interleaving. Finally, note that the computer system discussed with reference to FIG. 4 has 4 bank select bits, with two bank select bits allocated to contiguous page interleaving and two bank select bits allocated to cache effect interleaving. However, as shown in table 49 of FIG. 8, the optimal allocation for such a system is to allocate three bank select bits to cache effect interleaving, and one bank select bit to contiguous page interleaving.

The present invention dramatically improves the page hit rate of a main memory system. Table 1 below illustrates the page hit rates achieved based on the number of bank bits for a typical prior art addressing scheme wherein banks, row, and columns are assigned in groups to sequential bits from the logical address (the BRC scheme) versus the optimal scheme shown in FIG. 8.

TABLE 1

| Number of Bank Bits | BRC Scheme Hit Rate | Optimal Scheme Hit Rate | Improvement |
|---|---|---|---|
| 0 | 0.250 | 0.250 | 0.0% |
| 1 | 0.254 | 0.403 | 58.7% |
| 2 | 0.303 | 0.513 | 69.3% |
| 3 | 0.346 | 0.633 | 83.0% |
| 4 | 0.353 | 0.718 | 103.7% |
| 5 | 0.362 | 0.765 | 111.3% |
| 6 | 0.366 | 0.800 | 118.6% |
| 7 | 0.419 | 0.834 | 99.1% |
| 8 | 0.495 | 0.866 | 75.0% |

As can be seen from Table 1, the present invention provides a substantial improvement in the page hit rate for any memory configuration having at least one bank select bit. Of course, with zero bank select bits there is only a single logical page buffer and a precharge cycle is required whenever a different page is accessed.

In the embodiment described above, bank bits are allocated to cache effect and contiguous page interleaving based on a one-to-one address mapping of bank bits to logical address bits. In another embodiment, the bank bits are formed by combining bits from the cache effect region (the least significant logical address bits coincident with the cache tag bits) with bits from the contiguous page effect region (the least significant address bits more significant than the column address bits) by applying a function, such as an exclusive OR operation or an addition operation. This embodiment improves the page hit rate over the embodiment discussed with respect to FIG. 7.

Figure 9:
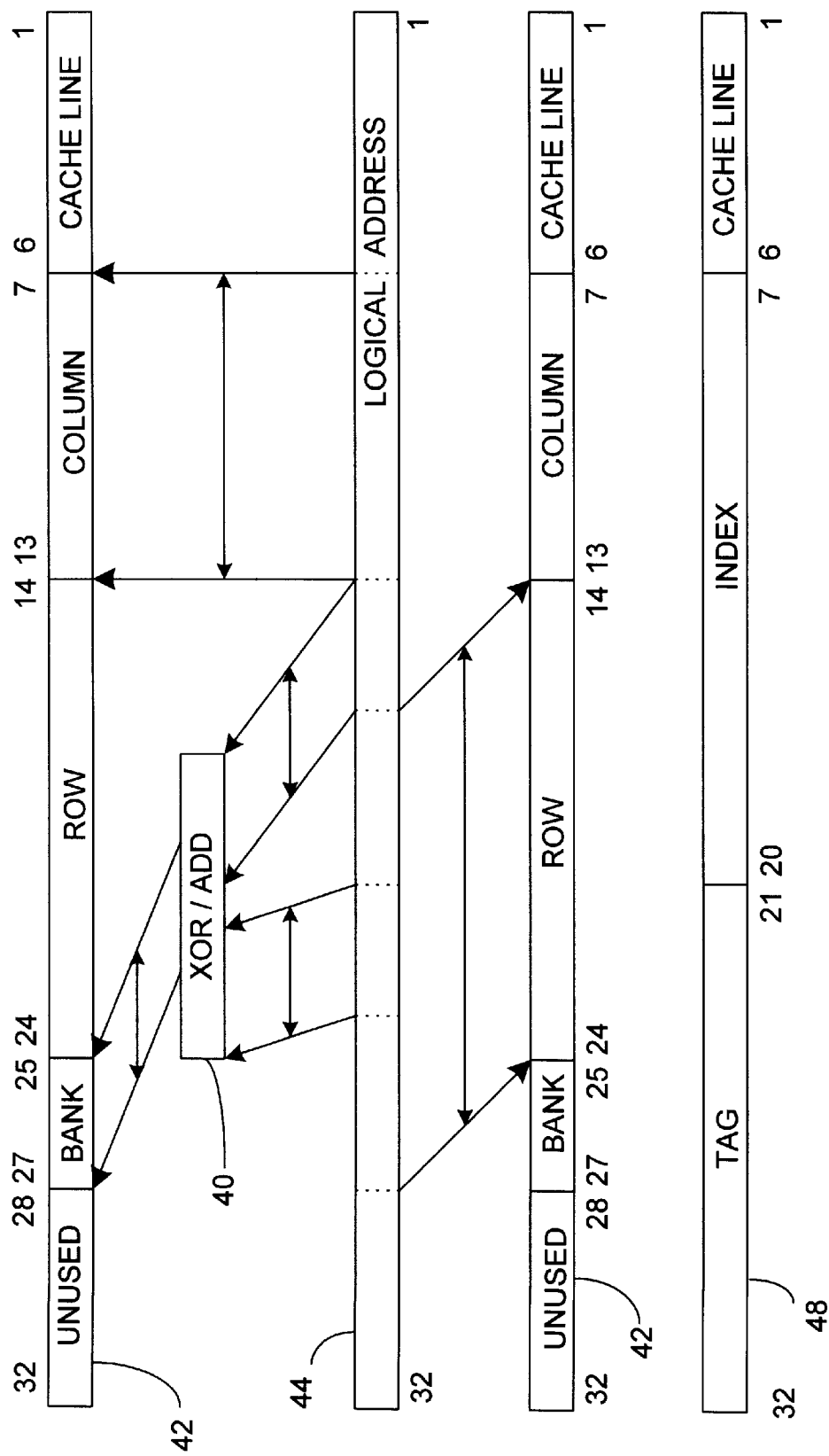
FIG. 9 illustrates a logical address to main memory address map for another embodiment of the present invention wherein bank select bits are generated by combining two bit ranges from the logical address using a function such as an addition operation or an exclusive-OR operation.

FIG. 9 illustrates this embodiment for a computer system having 8 memory banks, and therefore 3 bank select bits. For convenience, cache memory organization 48 is shown at the bottom of FIG. 9. Since some of the bit mappings in this embodiment involve overlapping bit regions, main memory organization 42 is shown twice, with logical address organization 44 between the two instances of main memory organization 42.

In the embodiment shown in FIG. 9, the column bits are mapped as discussed above with reference to FIG. 7. The first three address bits above the column bits are routed function 40, along with first three address bits corresponding to the first three bits of the tag. Note that in FIG. 9, function 40 is shown as either an exclusive-OR function or an addition function, though other functions may be used, as described below. Function 40 combines the first three bits above the column bits with the three bits corresponding to the first three tag bits to form three bank select bits.

The bits of the logical address between the unused portion and the first three address bits above the column bits, exclusive, are routed to the row bits. Note that the three bits corresponding to the first three tag bits are actually used twice, once to form the bank bits at function 40 and again as part of the set of row bits.

To understand how the embodiment shown in FIG. 9 can improve the page hit rate, consider that the main purpose of cache effect interleaving is to steer cache line cast outs and corresponding cache line reads into separate banks so they do not thrash a single logical page buffer. Since a cast out and a corresponding cache line read have the same cache index, the bits immediately above the column bits are the same. Thus, using a function such as an addition operation or an exclusive-OR operation will preserve difference between the bits from the tag boundary. The purpose of contiguous page interleaving, on the other hand, is to spread the memory usage across as many banks as possible. Combining the bits from the tag boundary with the bits from the column boundary will tend to slightly improve the distribution of the addresses across the memory banks.

Figure 8:
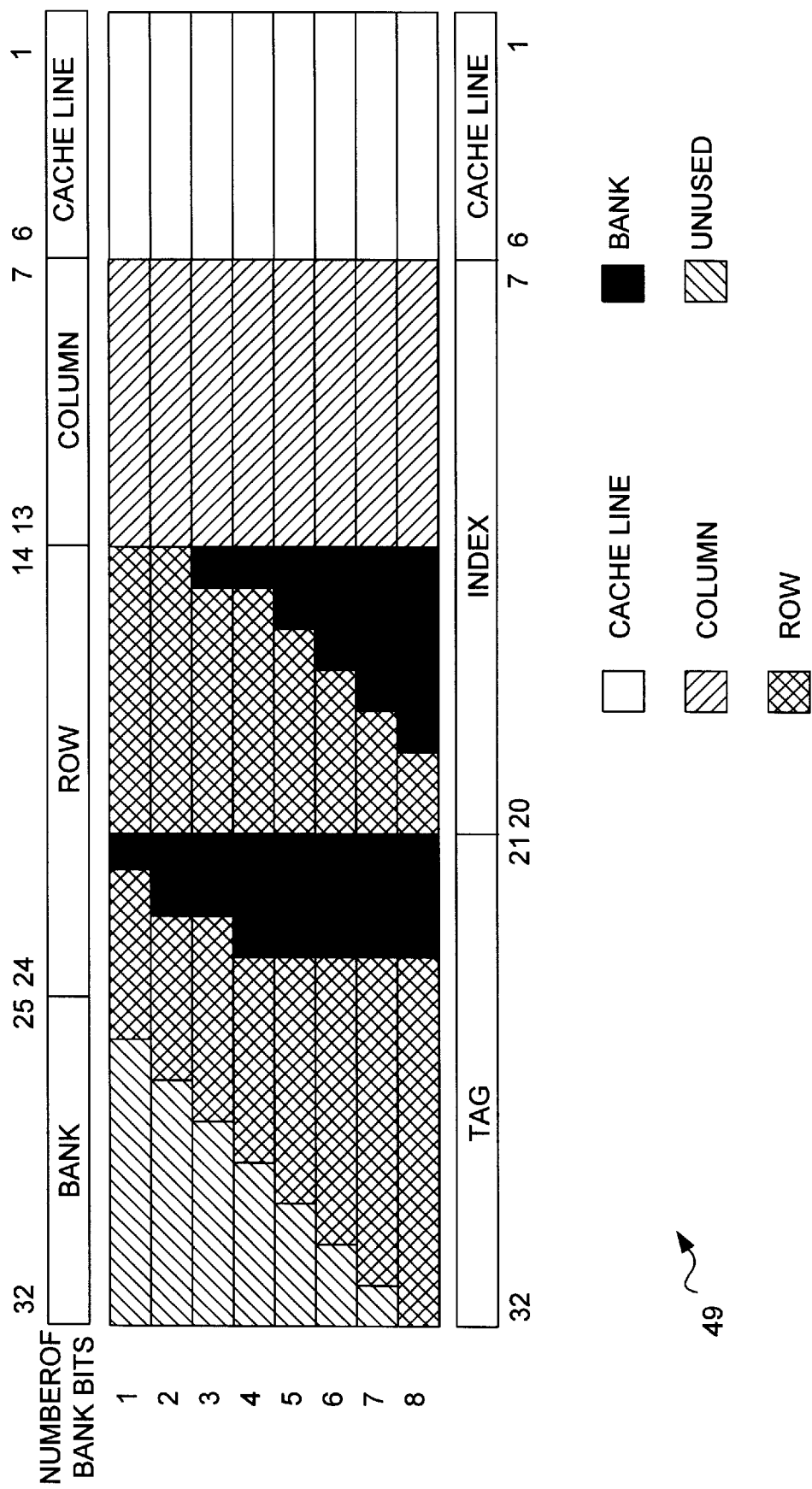
FIG. 8 shows the optimal overall logical address to main memory address mappings for computer systems similar to the computer system shown in FIG. 2 and having between 1 and 8 bank select bits.

As shown in table 49 of FIG. 8, in a computer system having only three bank bits that are directly mapped, the optimal indexing scheme allocates two of the bits to cache effect interleaving and one of the bits to contiguous page interleaving. With only two bank bits allocated to cache effect interleaving, there is no more than a 1 in 4 chance that a cast out and corresponding cache line read will access the same bank. However, this still produces page misses. Similarly, with only a single bank bit allocated to contiguous page interleaving, program "hot spots" larger than two logical page buffers will tend to produce page misses.

By generating the bank bits using a function, as shown in FIG. 9, three bits are available to both cache effect interleaving and page effect interleaving. Now, a cast out and corresponding cache line read will have no more than a 1 in 8 chance of belonging to the same bank. Also, sequential memory pages are spread across all eight banks, thereby allowing larger program "hot spots" without having to endure a high rate of page misses.

Table 2 below shows the page hit rates achieved by directly mapping bank bits versus forming bank bits using a function, as described above.

TABLE 2

| Number of Bank Bits | Optimal Hit Rate Direct Mapped | Optimal Hit Rate Function-Based |
|---|---|---|
| 0 | 0.250 | 0.250 |
| 1 | 0.403 | 0.413 |
| 2 | 0.513 | 0.569 |
| 3 | 0.633 | 0.682 |
| 4 | 0.718 | 0.754 |
| 5 | 0.765 | 0.795 |
| 6 | 0.800 | 0.829 |
| 7 | 0.834 | 0.852 |
| 8 | 0.866 | 0.891 |

While the incremental improvement provided by function-based bank bit generation over direct bank bit mapping is not as significant as the improvement of direct bank bit mapping over the BRC scheme shown in Table 1, it is still cost effective given that very little additional logic is required to implement the function that forms the bank bits.

There are some restrictions on the function that can be used for forming the bank select bits. Specifically, the mapping from the logical address to the row, column, and bank bits should be one-to-one. In other words, every unique logical address should translate to a unique main memory address. Both an addition operation (ignoring any carry out) and an exclusive-OR operation satisfy this requirement. A multiplication operation and a logical-OR operation are two functions that do not satisfy this requirement.

In the embodiment shown in FIG. 9, it is possible, but not harmful, for the contiguous page interleaving bits to overlap with the cache effect interleaving bits if a large number of bank bits are used. Indeed, for systems that may be populated with 256 banks, the simplest implementation may be to simply add or exclusive-OR eight bits from the tag cache effect interleaving region with eight bits from the contiguous page interleaving region. Then, simply select the required number of bank bits from the result of the function and use however many high-order address bits as are required for row selection. Such an implementation is not significantly more complex than prior art indexing schemes.

The present invention provides a significant improvement over prior art memory indexing schemes. With little additional logic, page hit rates increase substantially. While the present invention is valuable when implemented in current computer designs, the present invention will become more valuable as the art of computer design progresses. One trend in the field of computing is that DRAM chips continue to hold more data, thereby increasing the size of memory banks. However, since the size of a page buffer is typically related to the square root of the DRAM size, the ratio of page buffer storage to main memory storage will decrease. For example, the 4 megabit DRAM chip discussed above has a 256 byte page buffer. However, a 16 megabyte DRAM chip formed from an array of 4,096 rows and 4,096 columns has only a 512 byte page buffer. While the 16 megabyte DRAM chip is four times as large, its page buffer is only twice as large. As the ratio of page buffer storage to main memory storage decreases, it is even more important to manage page buffers wisely. The present invention maximizes page buffer usage across all memory banks, thereby mitigating the effects of decreasing page buffer ratios.

Another trend in the field of computing is that the size of programs continue to increase. As programs increase in size, so do the hot spots of the program. Accordingly, programs of the future will cycle more memory blocks through the cache at increasingly higher rates. In addition, the hot spots of the program will consume ever larger contiguous regions. By maximizing the availability of page buffers using both cache effect interleaving and contiguous page interleaving, the present invention will mitigate the effects of increasing program sizes.

Although the present invention has been described with reference to preferred embodiments, workers skilled in the art will recognize that changes may be made in form and detail without departing from the spirit and scope of the invention.

What is claimed is:

1. A computer system comprising:
   a processor that generates a logical address to facilitate memory accesses;
   a main memory unit that includes a plurality of banks, wherein each bank of the plurality of banks includes a page buffer, and the main memory unit is addressed via bank, row and column bits;
   a cache memory coupled to the processor, the cache memory holding a subset of contents of the main memory unit, wherein the cache memory is organized into sets of cache lines that are addressed by an index portion of the logical address, and a tag portion of the logical address is associated with each cache line;
   a memory controller coupled between the main memory unit and the cache memory, wherein the memory controller generates from the logical address the bank, row, and column bits required by the main memory unit, and one or more bits from the tag portion of the logical address are used to generate a first set of one or more bank bits, thereby increasing the probability that a cache line cast out and a corresponding cache line read to the same cache line as the cache line cast out access different page buffers of the main memory unit.

2. The computer system of claim 1 wherein a portion of the bank bits are used as rank bits.

3. The computer system of claim 1 wherein the one or more bits from the tag portion of the logical address that are used to generate the first set of one or more bank bits are less significant bits of the tag portion.

4. The computer system of claim 1 wherein the first set of one or more bank bits are directly mapped to a corresponding set of one or more bits from the tag portion of the logical address.

5. The computer system of claim 1 wherein an address bit of the logical address is mapped to each column bit, and one or more bits of the logical address immediately above in significance the most significant address bit of the logical address mapped to a column bit are used to generate a second set of one or more bank bits.

6. The computer system of claim 5 wherein the second set of one or more bank bits are directly mapped to a corresponding set of one or more bits of the logical address immediately above in significance the most significant address bit of the logical address mapped to a column bit.

7. The computer system of claim 5 wherein the first set of one or more bank bits and the second set of one or more bank bits each comprise a combined set of bank bits such that the first and second set of one or more bank bits include the same bank bits, and the combined set of bank bits is generated by combining the one or more bits of the logical address immediately above in significance the most significant address bit of the logical address mapped to a column bit and the one or more bits from the tag portion of the logical address using a combination function.

8. The computer system of claim 7 wherein the combination function is an exclusive-OR function.

9. The computer system of claim 7 wherein the combination function is an addition function.

10. A method of converting a logical address generated by a processor in a computer system to bank, row, and column bits used to access a main memory system in the computer system, wherein the main memory system includes a plurality of banks, with each bank of the plurality of banks including a page buffer, the computer system also includes a cache memory that holds a subset of contents of the main memory, and the cache memory is organized into sets of cache lines that are addressed by an index portion of the logical address, and a tag portion of the logical address is associated with each cache line, the method comprising:
   generating a first set of one or more bank bits based on one or more bits from the tag portion of the logical address, thereby increasing the probability that a cache line cast out and a corresponding cache line read to the same cache line as the cache line cast out access different page buffers of the main memory unit; and
   generating row and column bits, and bank bits not part of the first set of one or more bank bits, from the logical address.

11. The method of claim 10 wherein a portion of the bank bits are used as rank bits.

12. The method of claim 10 wherein generating a first set of one or more bank bits based on one or more bits from the tag portion of the logical address comprises:
   generating a first set of one or more bank bits based on one or more bits from less significant bits of the tag portion.

13. The method of claim 10 wherein generating a first set of one or more bank bits based on one or more bits from the tag portion of the logical address comprises:
   directly mapping a corresponding set of one or more bits from the tag portion of the logical address to the first set of one or more bank bits.

14. The method of claim 10 wherein generating row and column bits, and bank bits not part of the first set of one or more bank bits, from the logical address includes:

mapping an address bit of the logical address to each column bit; and generating a second set of one or more bank bits from one or more bits of the logical address immediately above in significance the most significant address bit of the logical address mapped to a column bit.

15. The method of claim 14 wherein generating a second set of one or more bank bits from one or more bits of the logical address immediately above in significance the most significant address bit of the logical address mapped to a column bit comprises:

directly mapping the second set of one or more bank bits to a corresponding set of one or more bits of the logical address immediately above in significance the most significant address bit of the logical address mapped to a column bit.

16. The method of claim 14 wherein the first set of one or more bank bits and the second set of one or more bank bits each comprise a combined set of bank bits such that the first and second set of one or more bank bits include the same bank bits, and further comprising:

generating the combined set of bank bits by combining the one or more bits of the logical address immediately above in significance the most significant address bit of the logical address mapped to a column bit with the one or more bits from the tag portion of the logical address using a combination function.

17. The method of claim 16 wherein the combination function is an exclusive-OR function.

18. The method of claim 16 wherein the combination function is an addition function.

* * * * *